United States Patent
Werner et al.

(10) Patent No.: US 10,122,533 B1
(45) Date of Patent: Nov. 6, 2018

(54) CONFIGURATION UPDATES FOR ACCESS-RESTRICTED HOSTS

(71) Applicant: Amazon Technologies, Inc., Reno, NV (US)

(72) Inventors: Justin Lee Werner, Federal Way, WA (US); Gregory Alan Rubin, Seattle, WA (US); Matthew John Campagna, Bainbridge Island, WA (US); Michael Bentkofsky, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 133 days.

(21) Appl. No.: 14/969,876

(22) Filed: Dec. 15, 2015

(51) Int. Cl.
| | |
|---|---|
| *H04L 29/06* | (2006.01) |
| *H04L 9/32* | (2006.01) |
| *H04L 12/24* | (2006.01) |
| *G06F 9/4401* | (2018.01) |

(52) U.S. Cl.
CPC .......... *H04L 9/3247* (2013.01); *G06F 9/4416* (2013.01); *H04L 41/0816* (2013.01); *H04L 2209/72* (2013.01)

(58) Field of Classification Search
CPC ... H04L 41/08; H04L 9/3247; H04L 41/0816; H04L 2209/72; G06F 9/4416
See application file for complete search history.

(56) References Cited

U.S. PATENT DOCUMENTS

| | | | | |
|---|---|---|---|---|
| 7,177,839 B1* | 2/2007 | Claxton | .................. | G06Q 20/12 705/44 |
| 8,214,653 B1* | 7/2012 | Marr | ..................... | G06F 21/572 380/286 |
| 8,607,046 B1* | 12/2013 | Silberman | ............. | H04L 9/3228 713/168 |
| 9,774,452 B2* | 9/2017 | Bjarnason | ............. | H04L 9/3213 |
| 2003/0115461 A1* | 6/2003 | O'Neill | .................... | G06F 21/57 713/170 |
| 2005/0015471 A1* | 1/2005 | Zhang | ................. | H04L 63/0442 709/221 |
| 2006/0156007 A1* | 7/2006 | Stephens-Doll | ...... | H04L 9/3239 713/176 |
| 2008/0244064 A1* | 10/2008 | Yeung | ................. | H04L 41/5038 709/224 |
| 2009/0031123 A1* | 1/2009 | Kruys | ..................... | H04L 41/08 713/1 |
| 2010/0287363 A1* | 11/2010 | Thorsen | ................ | G06F 21/575 713/2 |

(Continued)

*Primary Examiner* — Eleni A Shiferaw
*Assistant Examiner* — Sher A Khan
(74) *Attorney, Agent, or Firm* — Hogan Lovells US LLP

(57) ABSTRACT

A host machine operated for a specific purpose can have restricted access to other components in a multi-tenant environment in order to provide for the security of the host machine. The access restriction can prevent the host machine from obtaining updates to critical system-level configurations, but such information can be obtained through a signed command received to an API for the host machine. The command can be signed by a quorum of operators, and the host machine can be configured to verify the signatures and the quorum before processing the command. The host machine can store the updates to ephemeral storage as well as persistent storage, such that upon a reboot or power cycle the host machine can operate with current configuration data.

17 Claims, 5 Drawing Sheets

(56) References Cited

U.S. PATENT DOCUMENTS

| | | | |
|---|---|---|---|
| 2011/0217047 A1* | 9/2011 | Dong | H04J 3/1652 |
| | | | 398/182 |
| 2012/0147894 A1* | 6/2012 | Mulligan | G06F 9/45533 |
| | | | 370/395.53 |
| 2012/0179801 A1* | 7/2012 | Luna | H04L 61/6009 |
| | | | 709/223 |
| 2013/0191453 A1* | 7/2013 | Nishanov | G06F 9/5061 |
| | | | 709/204 |
| 2013/0318343 A1* | 11/2013 | Bjarnason | H04L 41/0809 |
| | | | 713/157 |
| 2014/0380054 A1* | 12/2014 | Roth | H04L 9/0822 |
| | | | 713/171 |
| 2015/0172255 A1* | 6/2015 | Warnez | H04W 4/001 |
| | | | 713/168 |
| 2016/0112203 A1* | 4/2016 | Thom | H04L 9/3247 |
| | | | 713/176 |
| 2016/0226843 A1* | 8/2016 | Koike | H04L 63/06 |
| 2016/0359878 A1* | 12/2016 | Prasad | H04L 63/1425 |
| 2018/0131523 A1* | 5/2018 | Thom | H04L 63/102 |

\* cited by examiner

CONFIGURATION UPDATES FOR ACCESS-RESTRICTED HOSTS

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Because a resource provider will often provide resource access to many different users, various types of credentials can be used to authenticate a source of the request, as well as to demonstrate that the source is authorized to access a resource to perform a task. Further, certain resources may be restricted from communicating with other resources in the environment in order to provide a higher level of security for those restricted resources, in case one or more unrestricted resources become compromised or otherwise include data or functionality that could negatively impact the security of the restricted resources. A downside to the restriction, however, is that it can be difficult to provide the restricted resources with updated configuration information, which can impact the ability of the restricted resources to function properly if they are using outdated network configuration information.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of resources in an electronic environment. In particular, various approaches enable host machines to be provisioned for specific purposes, and where those purposes require a certain level of security the host machines can have restricted access for other systems, services, or components within the electronic environment. Due to these restrictions, the host machines may not be able to receive critical system-level configuration updates from a configuration manager or other such service. In order to enable the host machines to be able to obtain the configuration updates without having to take the hosts offline for reconfiguring, approaches in accordance with various embodiments provide for the use of signed commands that can be received to an application programming interface (API) or other interface of a host machine. The command can be signed by one or more operators, such that the host machine can verify the validity and number of signatures before processing the command. In some embodiments a specified number, minimum number, or quorum number of operators sign the command before the command is processed. Upon verification, the host machine can write the configuration changes to ephemeral storage, such as a RAM disk or other root file system for operation of the host machine. The host machine can also persist the change to a location on local storage, such as a hard disk or solid state drive. Upon a reboot or power cycle, the updated configuration can be loaded from local storage such that the host machine has current configuration information even without the ability to communicate with a configuration manager or other such service.

Various other such functions can be used as well within the scope of the various embodiments as would be apparent to one of ordinary skill in the art in light of the teachings and suggestions contained herein.

Figure 1:
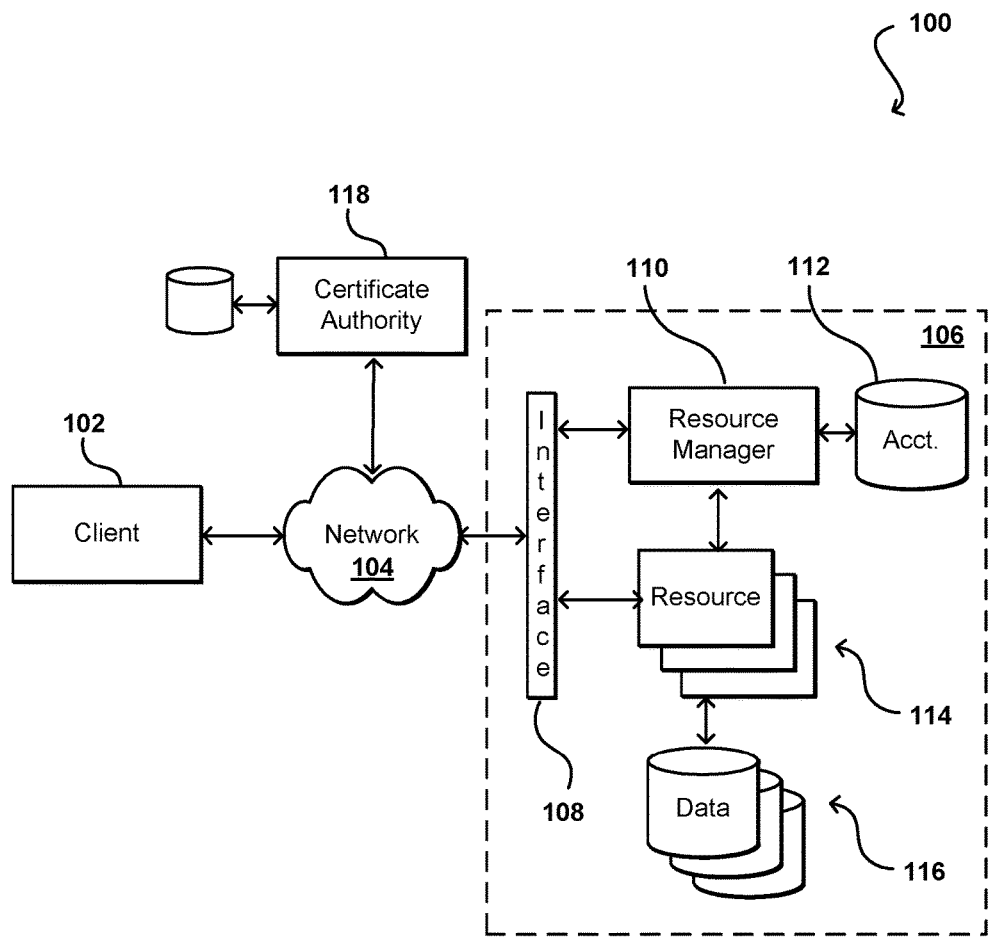
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an certificate authority 118, a key management service, a corporate entity, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors. In some embodiments the resources or operators within the environment can obtain credentials useful in signing commands or requests for various purposes as discussed and suggested herein. Although illustrated outside the resource provider environment, it should be understood that the certificate authority could be a service offered from within the resource provider environment, among other such options.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, in some instances it might be the case where a host device (or other computing resource) is provisioned for a particular purpose. If the particular purpose relates to sensitive or secure matters, such as the management of cryptographic materials, it may be beneficial to at least partially restrict access to the host, both with respect to entities outside the resource provider environment as well as to other resources or management components within the environment. For example, a host device that is running in a restricted access state due to the sensitive nature of its operation may be restricted from communicating with a configuration manager or resource manager that can affect the operation of the host. For example, a configuration manager might be able to change addresses that the host uses to communicate certain information, and a compromised configuration manager might be able to cause sensitive information to be directed to an unintended recipient, etc. Thus, a dedicated purpose host can be restricted from access by such systems, services, and components.

A problem can arise from the fact that information cannot be passed to a restricted access host using conventional approaches in the network. For example, a change to domain name service (DNS) or network time protocol (NTP) information across the network may be propagated out to the various host devices by a configuration manager, but this information will not be communicated to a restricted access host because the configuration manager is prevented from communicating with the restricted access host. Upon a reboot, for example, the restricted access host can obtain configuration information from an on-disk file system instead of from the configuration manager or other configuration system. If the host did not receive any of the network or system configuration updates that were otherwise propagated through the system, the host could reboot incorrectly or not at all. Even if the host is able to reboot, the outdated configuration information can prevent the host from operating as intended.

Approaches in accordance with various embodiments can attempt to ensure that network, system, or environment configuration changes and other updates are provided to restricted access hosts, and other computing devices, even when the conventional mechanism for providing that information is restricted from communicating with the restricted access hosts. In at least some embodiments, a restricted access host can include a set of application programming interfaces (APIs) or other such interfaces that are able to receive calls from a set of trusted operators. An operator, as referred to herein, can be any appropriate trusted entity with cryptographic materials that enable other systems to verify that messages or commands have been sent from, or approved by, that operator. These can include, for example, a Web service, a restricted host machine, or a human user of resources in the environment. The calls can be signed by the operators in order to be received and processed by the restricted access host. Further, in at least some embodiments a quorum, or other specified or minimum number, of trusted operators must sign a command before that command will be processed, in order to maintain the security of the restricted access host. This can include, for example, a specified or minimum number of operators, such as two or at least two operators. In other embodiments this can include a quorum based upon the number of potential responding operators. This can include, for example, at least one half of the potential responding operators, among other such options.

The APIs provided and calls supported can depend at least in part upon the types of configuration changes that should be provided to a restricted access host, at least for a particular purpose. This can include, for example, changes to DNS or NTP addresses, among other such changes. The signed commands can be processed to cause this information to be stored to the appropriate locations on the restricted-access host. This can include, for example, updating of the running host's command-specific configuration, as may be stored in a RAM disk or other such location or device. This can further include updating the configuration data stored to a local disk or drive, such as a solid state, optical, or magnetic drive, such that upon a reboot the host can pull the updated configuration information from local persistent storage. The configuration updates thus can be locally stored on the host as if the configuration updates had been provided by the configuration management system or service. Such an approach can preserve the security properties and state of the restricted access host, while enabling that host to consume significant configuration changes. The operator controls also provide valuable oversight into the configuration changes that are to be made, and enable the system configuration changes to be handled in a manner consistent with the normal operation of the special purpose host.

Figure 2:
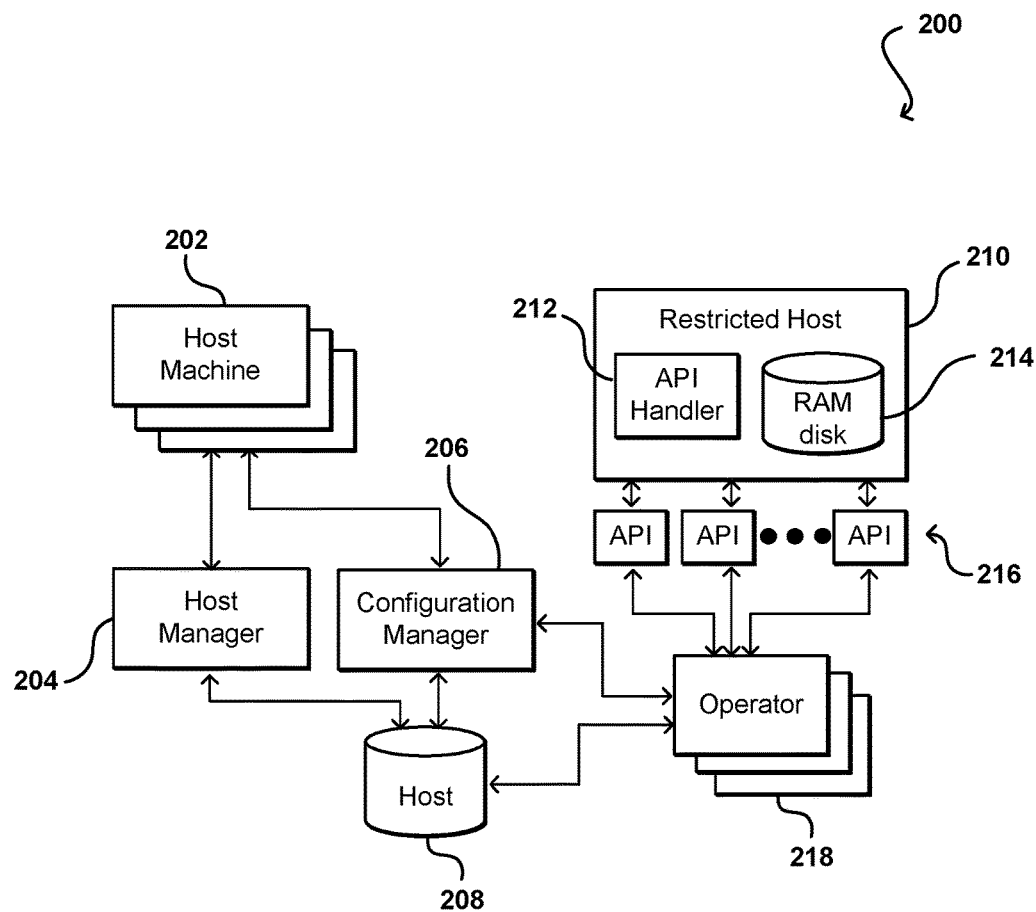
FIG. 2 illustrates an example configuration wherein special purpose, restricted access host is unable to receive updated configuration data from a configuration manager and instead must receive signed commands from a quorum of host operators that can be utilized in accordance with various embodiments.

FIG. 2 illustrates an example environment 200 that can be utilized in accordance with various embodiments. In this example, a host manager 204 (such as the resource manager mentioned previously) and a configuration manager 206 can be configured to manage the operation of a set of host machines 202, such as network servers and the like. Under conventional operation, the configuration manager 206 would provide the host machines 202 with current configuration information, and the host manager would manage the operations of the host machines, such as to push updates, provision new host instances, etc. These components can pull data from a host data store 208 or other such location accessible within the resource provider network. When a restricted access host 210 is to be provisioned, the host can be provisioned as a conventional host, whereby the host is provisioned by the host manager 204 and receives current system configuration information from the configuration manager 206. In this example, the restricted access host 210 can be configured, by the configuration information provided by the configuration manager 206, to use hosts A, B, and C for its DNS service. This information can be stored to local storage on the host, such as may be part of an on-disk root file system. The information can also be updated to a root file system, as may operate in a RAM disk 214 or other such virtual drive on the host machine. The restricted host can then be caused to enter an operating mode, such as may involve running on the RAM disk, and can be disengaged from at least some of the resources in the resource provider environment, such as the host manager 204 and configuration manager 206. Various other access restrictions can be put in place as well as would be understood to one of ordinary skill in the art in light of the teachings and suggestions contained herein.

In this example, the configuration manager 206 might detect that, or cause, the correct name servers going forward to be hosts E, F, and G. Because the restricted access host 210 does not have access to these changes, the host would no longer be able to properly resolve IP addresses. Even a reboot following a power cycle would not cause the host to discover the correct name servers, as the host would be restricted from contacting the configuration manager 206 or other such components.

Approaches in accordance with various embodiments can provide various commands that can be passed to one or more APIs 216, or other interfaces, of a restricted access host. For this example, this can include a command to update the DNS name servers, although various other commands can be utilized as well within the scope of the various embodiments. In this example, a host operator 218 can create the appropriate command to be submitted to the restricted access host 210. A number of operators 218 can then sign the command, using an appropriate signing certificate. As mentioned, this can include a specified or minimum number of operators, or a quorum of operators, among other such options. After the determined number of operators have signed the command, one of the operators can cause the signed command to be submitted to the appropriate API. Upon receiving the signed command, and performing any required verification checks, etc., an API handler 212 or other such component on the restricted access host 210 can update the DNS name server configuration in the root file system, in this example stored in a RAM disk 214. The API handler can also cause the name server configuration to be updated to the on-disk root file system, as may be stored in a hard drive, solid state drive, or other persistent storage on the restricted access host. With the updated configuration information, the restricted access host can operate as intended, even upon a power cycle or reboot, as the in-memory root file system can be populated using the on-disk configuration data.

In one embodiment, a command tool can be provided that enables the command to be generated. A determined number of operators can use secure tokens to sign the command at the request of the command tool. The command tool can then cause the command to be submitted to the appropriate API of a specific secure host. The command tool can keep track of the appropriate operators for various configuration changes, as well as the number of operators or quorum needed for each type of change to be submitted to the secure host. There can be various rules, policies, or settings relevant to the various potential configuration changes, which can be set by the resource provider, a security manager, a customer, or another such entity. The rules can also specify different types of operators, such that only two operators might be needed but these might be different types of operators or operators associated with different functionality or aspects of the system. Similarly, the quorum rules might require that the quorum be satisfied by a determined number of operators of the same type and/or specified types, among other such options. This can include, for example, one human operator and one operator corresponding to a specified Web service or one of a set of services, two human operators, a quorum of service operators, etc. Operators in some embodiments can fulfill different roles or groups, and a quorum rule might specify some combination of these operators. In some embodiments a list of possible acceptance criteria might be maintained, wherein the cryptographic signatures from the plurality of operators must satisfy at least one those acceptable criteria in order for the configuration data to be updated. The acceptance criteria can include, for example, signatures of a single signature of a specified type, two or more signatures of a single type, two or more signatures of different types, two or more signatures of a combination of types, or two or more signatures of specified types of the at least two types, among other such options.

A service stack inside the secure host can analyze the signed command to verify the signatures on the command. The service stack can also verify that the number of signatures satisfy the internal quorum rules or criteria. The host can cause the configuration to be written to ephemeral storage (i.e., to the RAM disk) for purposes of continued operation, and can be written to the mounted file system used to load the machine image in the case of a reboot or power cycle. In some embodiments the secure host will call out to local privileged code to implement the change both in the ephemeral running host as well as the necessary components in persistent storage. Upon a reboot, the secure host can utilize the read-only state image, local state data, and local updated configuration information, among other potential information. The credentials for the secure hosts in some embodiments are stored in a domain state, which functions as a replicated data repository between the hosts that is signed. This cryptographically signed state information can then be shared among all the hosts, and can be modified only in response to a quorum-based command.

Figure 3:
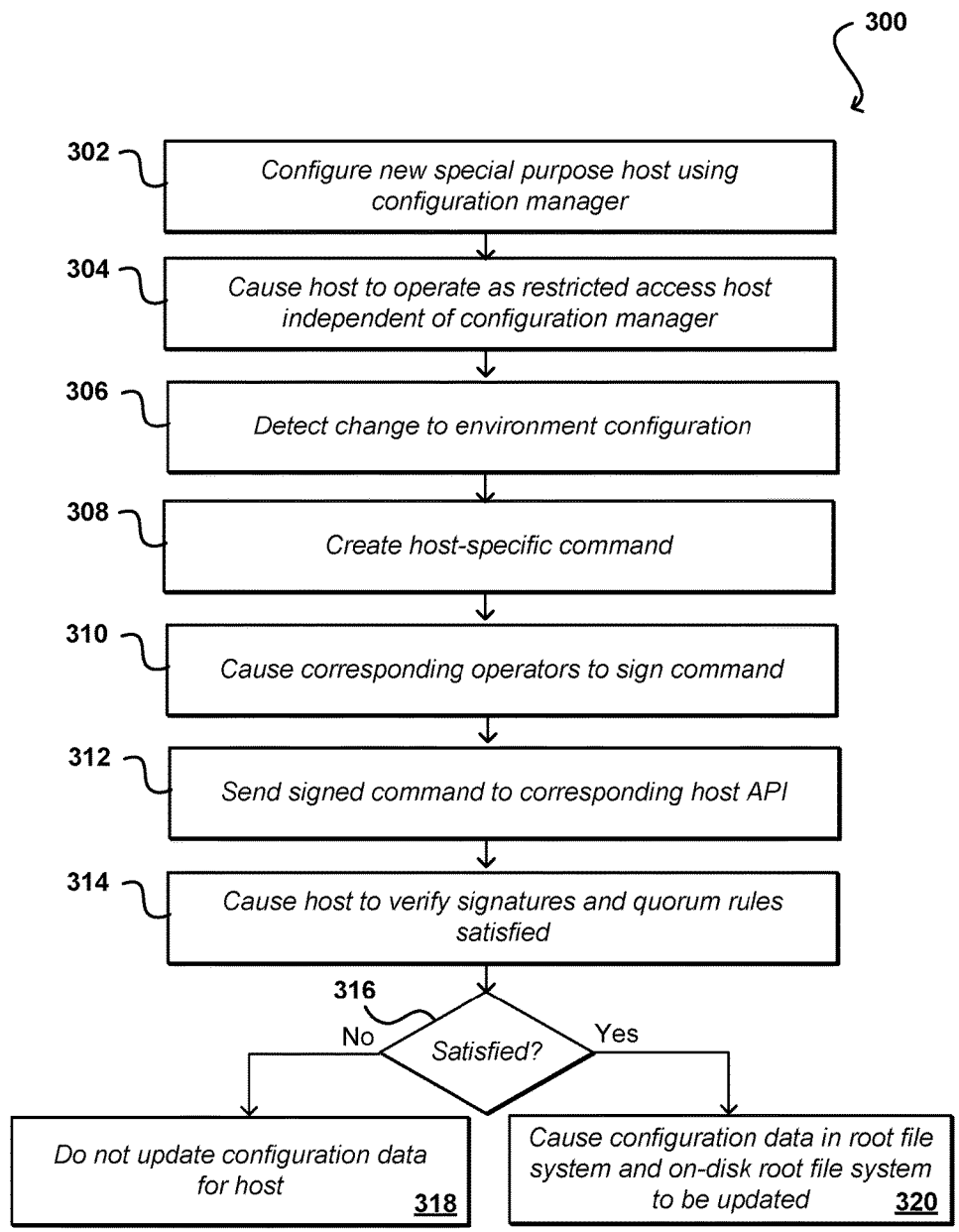
FIG. 3 illustrates an example process for enabling network configuration updates to be propagated to an access-restricted host that can be utilized in accordance with various embodiments.

FIG. 3 illustrates an example process 300 for updating configuration information for a restricted access host that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, a new special purpose host is provisioned and configured 302 using a configuration manager and other conventional systems and services of a resource provider environment or multi-tenant environment. After the configuration, the host can be caused 304 to operate as a restricted access host, which is independent of, and unable to communicate with, various systems and services within the environment, such as may include the configuration manager.

During operation of the special purpose host, a change to at least one critical system-level configuration can be detected 306. This can be in response to a monitoring component detecting the change, a notification provided by the configuration manager, or other such source. In some embodiments, the notification can be provided through a command tool or other such component. Through the command tool or another such component, a host-specific command can be created 308 to notify the host of the change. The command can be any appropriate command, such as a specified API call as discussed elsewhere herein. One or more corresponding operators can then be caused 310 to sign the command, such as by submitting a request to the appropriate available operators. In some embodiments, a determination can be made as to whether any quorum or number rules have been satisfied for the command before sending the command to the special purpose host. This can include, for example, a specified number of operators, a minimum number of operators, or a quorum of operators out of a determined set of operators, among other such options. If a quorum of operators does not sign the command, the configuration data in such an embodiment will not be propagated to the host and the host will not get an update of the configuration data. In other embodiments the operators may coordinate amongst themselves to generate a command signed by the appropriate operators, among other such options. In some embodiments more than the quorum of operators may sign the command, while in other embodiments only the specified number of operators may sign the command.

The command, once signed, can be sent 312 to the appropriate host API. Upon receiving the signed command, the special purpose host can be caused 314 to verify the signatures of the operators, such as by calling appropriate code or a verification service as discussed herein. The host can also be caused to verify that the quorum rules for the signatures were satisfied, as may be specified by one or more policies or rules associated with the type of command or change as discussed previously. This check can be in addition to, or in place of, such a verification performed before the signed operator is sent to the special purpose host. As mentioned previously, this can include determining whether the appropriate number and/or type(s) of operators signed the command using valid signatures. If it is determined 316 that the signatures are verified and quorum rules or other criteria satisfied, the host can be caused 320 to update the configuration data both in ephemeral storage, for the root file system, and in local persistent storage, as part of the on-disk root file system. If the quorum rules were not satisfied or the signatures were not all valid, for example, it can be determined to not update 318 the configuration data for the special purpose host.

Figure 4:
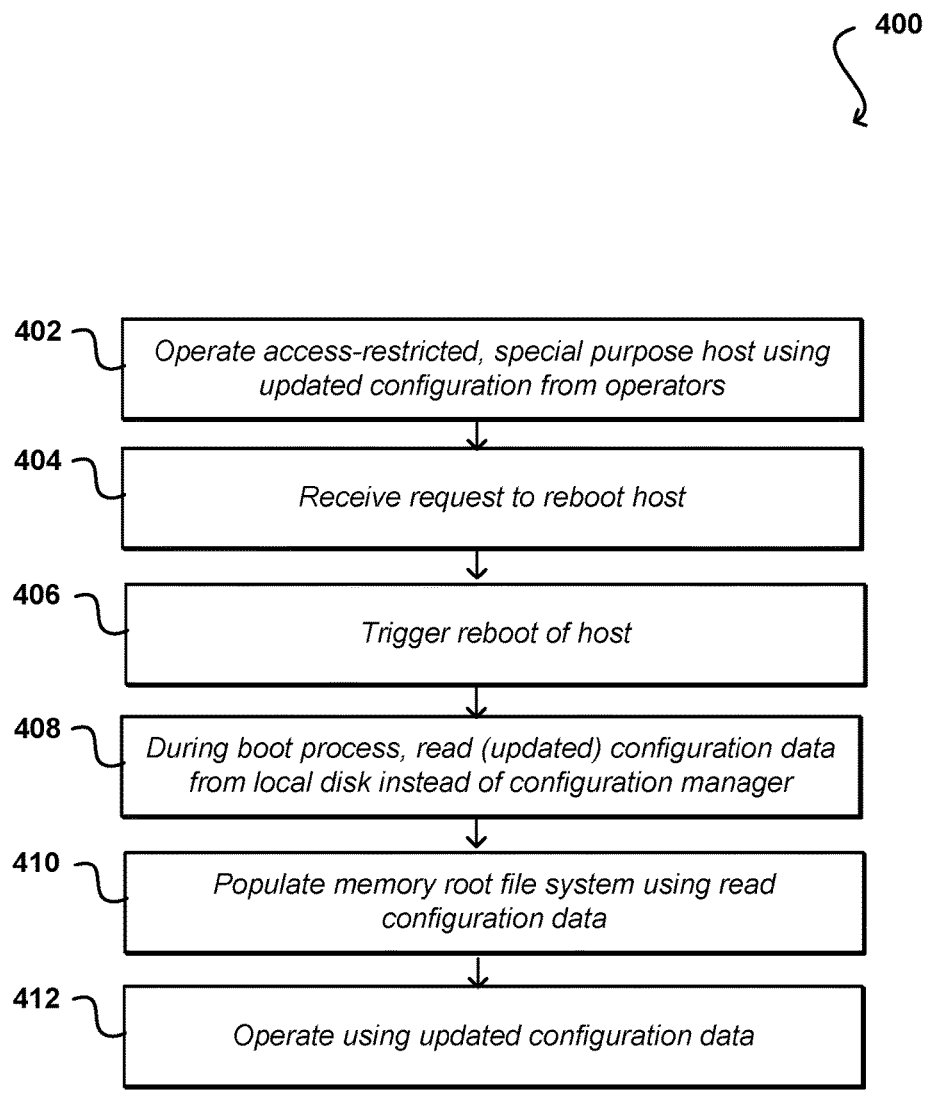
FIG. 4 illustrates an example process for enabling an access-restricted host to reboot using updated configuration information that can be utilized in accordance with various embodiments.

FIG. 4 illustrates an example process 400 for performing a reboot operation for a restricted access host that can be utilized in accordance with various embodiments. In this example, an access-restricted, special purpose host is operated 402 using updated configuration data received through a signed command as discussed with respect to the process of FIG. 3. Subsequent to receiving the updates, a request to reboot the host can be received 404. The request can be received from an external component within the environment, received as a signed command to an appropriate API, or received from an application executing on the secure host, among other such options. The request can also be received in response to a manual power cycle or other such action. In response, a reboot of the host can be triggered 406 or otherwise initiated. During the boot process, the updated configuration data can be read 408, along with the state image and local state data, among other such information. As mentioned, the updated state information was stored to persistent storage in response to verifying one or more signed commands. The configuration information can thus be current even though the host is unable to communicate with a configuration manager or other such service. The memory root file system (or ephemeral memory) can be populated 410 using the configuration data read from local persistent storage. The special purpose host can then be operated 412 using the updated configuration information, even with the restricted access preventing the host from obtaining current configuration data from conventional sources within the system.

Figure 5:
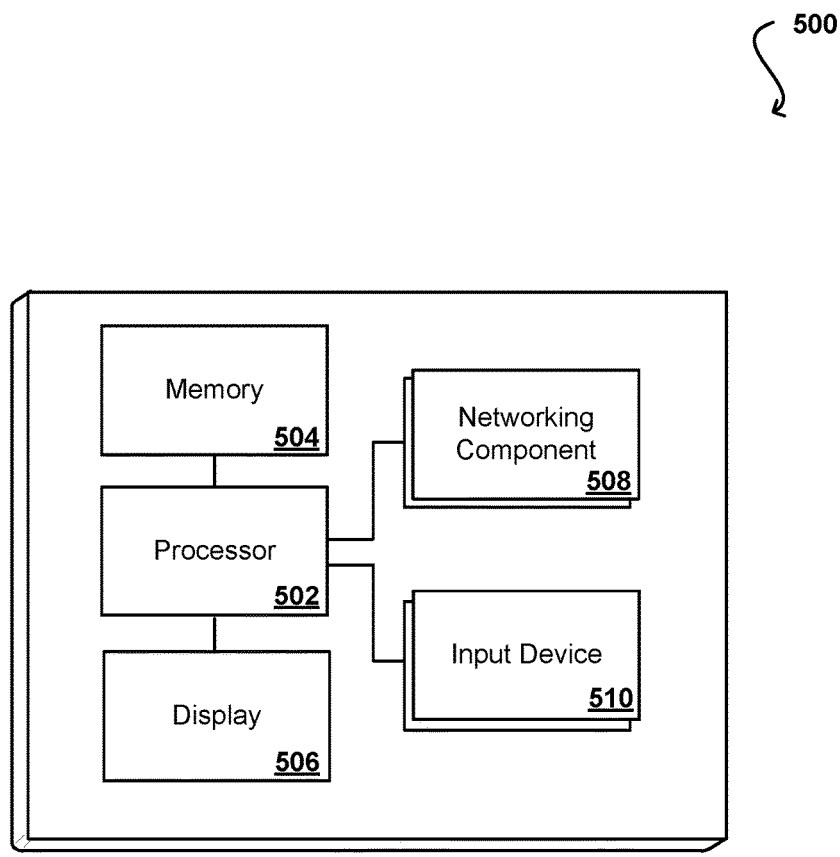
FIG. 5 illustrates example components of a computing device that can be used to implement aspects of various embodiments.

FIG. 5 illustrates a set of basic components of an example computing device 500 that can be utilized to implement aspects of the various embodiments. In this example, the device includes at least one processor 502 for executing instructions that can be stored in a memory device or element 504. As would be apparent to one of ordinary skill in the art, the device can include many types of memory, data storage or computer-readable media, such as a first data storage for program instructions for execution by the at least one processor 502, the same or separate storage can be used for images or data, a removable memory can be available for sharing information with other devices, and any number of communication approaches can be available for sharing with other devices. The device may include at least one type of display element 506, such as a touch screen, electronic ink (e-ink), organic light emitting diode (OLED) or liquid crystal display (LCD), although devices such as servers might convey information via other means, such as through a system of lights and data transmissions. The device typically will include one or more networking components 508, such as a port, network interface card, or wireless transceiver that enables communication over at least one network. The device can include at least one input device 510 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
provisioning, using at least one management component of a multi-tenant environment, a host machine operational for a specified purpose;
restricting access between the host machine and the at least one management component before causing the host machine to operate for the specified purpose;
determining a change to system-level configuration information in the multi-tenant environment;
generating a command indicating the change to the system-level configuration information;
determining a number of operators to establish a quorum of operators required to sign the command;
requesting the quorum of operators to cryptographically sign the command;
sending the command to an application programming interface (API) associated with the host machine based at least in part on whether the quorum of operators cryptographically signs the command;
causing the host machine to verify a number and a validity of cryptographic signatures used to sign the command;
causing the change to the system-level configuration information to be stored to ephemeral storage for operation of the host machine;
causing the change to the system-level configuration information to be stored to persistent storage on the host machine;
performing a reboot of the host machine;
causing the host machine to, upon the reboot of the host machine, re-verify the number and the validity of cryptographic signatures used to sign the command; and
after causing the host machine to re-verify the number and the validity of the cryptographic signatures, causing the host machine to load the change to the system-level configuration information from the local persistent storage into the ephemeral storage for operation of the host machine, without contacting the at least one management component.

2. The computer-implemented method of claim 1, further comprising:
determining the quorum of operators at least in part by analyzing at least one quorum rule to determine the number of signatures needed, the number of signatures including at least one of a specified number, a minimum number, or a minimum subset of available operators.

3. The computer-implemented method of claim 1, wherein the ephemeral storage includes a RAM disk operating on the host machine.

4. The computer-implemented method of claim 1, wherein the change to the system-level configuration information includes at least one of a change to domain name service (DNS) information or network time protocol (NTP) information for the multi-tenant environment.

5. A computer-implemented method, comprising:
restricting communication between a management system of an environment and a computing device operating in the environment, wherein the computing device after the restricting is unable to receive management information from the management system;
determining updated configuration information for the environment;
determining a number of a plurality operators to establish a quorum of operators required to sign a command;
requesting the quorum of operators to cryptographically sign the command indicating the updated configuration information;
transmitting the command to the computing device based at least in part on whether the quorum of operators cryptographically signs the command;
causing the computing device to verify that cryptographic signatures from the quorum of operators satisfy at least one signature criterion;
causing the computing device to store the updated configuration information to ephemeral storage, for operation of the computing device, and to local persistent storage on the computing device;
performing a reboot of the computing device;
causing the computing device to re-verify that the cryptographic signatures from the quorum of operators satisfy the at least one signature criterion, and
after causing the computing device to re-verify that the cryptographic signatures satisfy the at least one signature criterion, causing the computing device to load the updated configuration information from the local persistent storage into the ephemeral storage for operation of the computing device without contacting the management system.

6. The computer-implemented method of claim 5, wherein the environment is a multi-tenant environment.

7. The computer-implemented method of claim 5, further comprising:
causing the computing device to further load a machine image and local configuration information from the local persistent storage into the ephemeral storage without contacting the management system.

8. The computer-implemented method of claim 5, wherein the at least one signature criterion includes at least one of a number of cryptographic signatures or a validity of the cryptographic signatures.

9. The computer-implemented method of claim 8, further comprising:
  determining the number of cryptographic signatures at least in part by analyzing at least one quorum rule to determine the number of cryptographic signatures needed, the number of cryptographic signatures including at least one of a specified number, a minimum number, or a minimum subset of possible cryptographic signatures from a set of available trusted operators.

10. The computer-implemented method of claim 8, wherein each operator of the set of available trusted operators has an associated type selected from at least two types, and wherein the at least one signature criterion specifies that the cryptographic signatures from the quorum of operators include at least one signature of at least one type.

11. The computer-implemented method of claim 10, wherein the at least one signature criterion further specifies that the cryptographic signatures from the quorum of operators satisfy at least one of a set of acceptable signature criteria, the set of acceptable signature criteria including at least one of: a single signature of a specified type, two or more signatures of a single type, two or more signatures of different types, two or more signatures of a combination of types, or two or more signatures of specified types of the at least two types.

12. The computer-implemented method of claim 5, further comprising:
  transmitting the command to an API associated with the computing device.

13. The computer-implemented method of claim 5, wherein the updated configuration information includes at least one of a change to domain name service (DNS) information or network time protocol (NTP) information for the environment.

14. A system, comprising:
  at least one processor; and
  memory including instructions that, when executed by the at least one processor, cause the system to:
    prevent communication between a management system of an environment and a computing device operating in the environment, wherein the computing device after the restricting is unable to receive management information from the management system;
    determine updated configuration information for the environment;
    determine a number of a plurality operators to establish a quorum of operators required to sign a command;
    request the quorum of operators to cryptographically sign the command indicating the updated configuration information;
    transmit the command to the computing device based at least in part on whether the quorum of operators cryptographically signs the command;
    cause the computing device to verify that cryptographic signatures from the quorum of operators satisfy a signature criterion;
    cause the computing device to store the updated configuration information to ephemeral storage, for operation of the computing device, and to local persistent storage on the computing device;
    perform a reboot of the computing device;
    cause the computing device to re-verify that the cryptographic signatures from the quorum of operators satisfy the signature criterion; and
    after causing the computing device to re-verify that the cryptographic signatures satisfy the at least one signature criterion, causing the computing device to load the updated configuration information from the local persistent storage into the ephemeral storage for operation of the computing device without contacting the management system.

15. The system of claim 14, wherein the instructions when executed further cause the system to:
  configure the computing device using the management system before preventing the communication between the management system and the computing device.

16. The system of claim 14, wherein the signature criterion includes at least one of a number of cryptographic signatures or a validity of the cryptographic signatures, and wherein determining the number of cryptographic signatures at least in part by analyzing at least one quorum rule to determine the number of cryptographic signatures needed, the number including at least one of a specified number, a minimum number, or a minimum subset of possible cryptographic signatures from a set of available trusted operators.

17. The system of claim 14, wherein the updated configuration information includes at least one of a change to domain name service (DNS) information or network time protocol (NTP) information for the environment.

* * * * *